(12) United States Patent
Kinzelmann et al.

(10) Patent No.: US 10,533,077 B2
(45) Date of Patent: Jan. 14, 2020

(54) METHOD FOR BONDING USING ADHESIVE LAYERS WITH THE AID OF A LASER

(71) Applicants: Henkel AG & Co. KGaA, Duesseldorf (DE); Trumpf Laser—Und Systemtechnik GmbH, Ditzingen (DE)

(72) Inventors: Hans-Georg Kinzelmann, Pulheim (DE); Marcel Blodau, Krefeld (DE); Martin Sauter, Korntal-Muenchingen (DE); Michael Berger, Ditzingen-Hirschlanden (DE)

(73) Assignees: Henkel AG & Co. KGaA, Dusseldorf (DE); Trumpf Laser—Und Systemtechnik GmbH, Ditzingen (DE)

( * ) Notice: Subject to any disclaimer, the term of this patent is extended or adjusted under 35 U.S.C. 154(b) by 208 days.

(21) Appl. No.: 15/223,793

(22) Filed: Jul. 29, 2016

(65) Prior Publication Data
US 2016/0333154 A1 Nov. 17, 2016

Related U.S. Application Data

(63) Continuation of application No. PCT/EP2015/050341, filed on Jan. 9, 2015.

(30) Foreign Application Priority Data

Jan. 31, 2014 (DE) .................. 10 2014 201 778

(51) Int. Cl.
| | |
|---|---|
| *C08J 5/12* | (2006.01) |
| *B32B 37/00* | (2006.01) |
| *B32B 37/06* | (2006.01) |
| *B32B 37/12* | (2006.01) |
| *B32B 38/00* | (2006.01) |
| *C09J 5/02* | (2006.01) |

(Continued)

(52) U.S. Cl.
CPC ........... *C08J 5/121* (2013.01); *B32B 37/0015* (2013.01); *B32B 37/06* (2013.01); *B32B 37/12* (2013.01);
(Continued)

(58) Field of Classification Search
CPC ...... C08J 5/121; B29C 65/16; B29C 65/1619; B29C 65/1632; B29C 65/1658; B29C 65/48; B29C 65/72; B29C 65/7894
See application file for complete search history.

(56) References Cited

U.S. PATENT DOCUMENTS 5,088,047 A * 2/1992 Bynum ................ B22F 3/1055
156/272.8
6,207,925 B1 * 3/2001 Kendall ............... B23K 26/067
219/121.63

(Continued)

FOREIGN PATENT DOCUMENTS

DE 3744764 A1 6/1989
DE 102005028661 A1 12/2006

(Continued)

OTHER PUBLICATIONS

International Search Report for International PCT Patent Application No. PCT/EP2015/050341 dated Mar. 19, 2015.

*Primary Examiner* — Daniel McNally
(74) *Attorney, Agent, or Firm* — James E. Piotrowski

(57) ABSTRACT

The invention relates to a method and a device for bonding two substrates, wherein an adhesive is applied to a first substrate and a second film-type substrate consisting of a thermoplastic material is converted into a plasticized state by heating before being bonded to the first substrate.

14 Claims, 3 Drawing Sheets

(51) Int. Cl.
*C09J 131/04* (2006.01)
*C09J 133/08* (2006.01)
*C09J 175/04* (2006.01)
*C09J 183/00* (2006.01)

(52) U.S. Cl.
CPC ........ *B32B 37/1284* (2013.01); *B32B 38/164* (2013.01); *C08J 5/124* (2013.01); *C09J 5/02* (2013.01); *C09J 131/04* (2013.01); *C09J 133/08* (2013.01); *C09J 175/04* (2013.01); *C09J 183/00* (2013.01); *B32B 2037/1215* (2013.01); *B32B 2307/538* (2013.01); *B32B 2309/02* (2013.01); *B32B 2309/105* (2013.01); *B32B 2309/14* (2013.01); *B32B 2310/0806* (2013.01); *B32B 2439/70* (2013.01); *C08J 2331/04* (2013.01); *C08J 2333/08* (2013.01); *C08J 2375/04* (2013.01); *C08J 2383/00* (2013.01); *C09J 2205/306* (2013.01); *C09J 2205/31* (2013.01)

(56) References Cited

U.S. PATENT DOCUMENTS

| | | | | |
|---|---|---|---|---|
| 6,217,695 | B1* | 4/2001 | Goldberg | B05D 3/06 156/244.17 |
| 6,451,152 | B1* | 9/2002 | Holmes | B23K 26/034 156/173 |
| 2008/0099136 | A1* | 5/2008 | Krebs | C08J 5/128 156/273.3 |
| 2010/0243627 | A1* | 9/2010 | Lee | C03B 33/0222 219/121.72 |

FOREIGN PATENT DOCUMENTS

| | | |
|---|---|---|
| EP | 0050096 A1 | 4/1982 |
| EP | 2489760 A1 | 8/2012 |
| JP | H0995649 A | 4/1997 |
| WO | 03040249 A2 | 5/2003 |
| WO | 2011045833 A1 | 4/2011 |

\* cited by examiner

METHOD FOR BONDING USING ADHESIVE LAYERS WITH THE AID OF A LASER

The invention relates to a method and a device for bonding two substrates, wherein an adhesive is applied to a first substrate and a second film-type substrate consisting of a thermoplastic material is converted into a plasticized state by heating before being bonded to the first substrate.

DE 10 2005 028 661 A1 describes a method in which two-layer films consisting of thermoplastic materials can be produced continuously. Here, a thicker first film and a thinner second film consisting of the same material are used, wherein the two films are heated in a specified ratio such that the surfaces are plasticized and start to melt. These are then joined to one another immediately thereafter. The use of an adhesive to bond the materials is not described. A method without using an adhesive has the disadvantage that only substrates which are compatible with one another can be bonded to one another by heating.

WO 03/040249 A2 describes a method for laminating films on mold bodies, wherein the film is first heated by electromagnetic radiation, an adhesive is then applied to this film and it is finally bonded to the mold body, if necessary by pressing-on. Heating of the film is intended to reduce its stiffness during processing, thus leading to an improvement of the bond.

WO 2011/045833 A1 describes a method for producing steel sheets which are coated with a thermoplastic film. Here, the steel sheet is coated with an adhesive and the thermoplastic film applied to the surface-treated side of the steel sheet. The composite so obtained is then heated to the plasticizing temperature of the thermoplastic film by electromagnetic induction. Such a method has the disadvantage that it can only be used for bonding substrates, of which at least one can be heated by electromagnetic induction. As heating is carried out after bonding the two substrates, it must also be guaranteed that the composite is not damaged by heating.

The German patent application with the application number 10 2012 213 397.6, which is unpublished at the time of the present application, describes a method for bonding two substrates, wherein an adhesive with a layer weight less 2 g/m² is applied to a first substrate and this substrate is brought together with a second film-type substrate consisting of a thermoplastic material. At the same time, the surface of the second substrate is converted to a plasticized state by heating. The two substrates are bonded to one another by means of pressure before, during and/or immediately after heating. Heating can be carried out using plasma treatment, laser treatment, flame impingement, ultrasound, NIR radiation or IR radiation. Specifically, a continuous laminating method is described in which a thermoplastic film is first heated over a distance of 1 m along the running direction by means of an IR radiator and then bonded to another film coated with adhesive. Planar heating of a film in a continuous process can, however, lead to expansion of the film along the running direction. After cooling, this therefore results in stresses which can lead to deformation of the composite.

Methods for producing films which are joined to one another without an adhesive layer are known. A special selection of the film materials and an appropriately matched method process are required here. In order to achieve appropriate bonding, the surfaces and the materials of the substrates to be joined must be matched to one another.

It is also known to apply flexible film substrates to solid plastic or metal substrates. This can be done by means of an adhesive. However, in this case, it is usual to apply a sufficiently thick layer of adhesive. If substrates with a rough surface are used, it is necessary to apply an amount of adhesive which completely covers the surface. Only under this condition is adhesion over the whole surface possible. This is intended to avoid delamination due to water, due to weathering or other influences. Faults here can often be recognized by bubbles. Such optical defects are undesirable. It is known that, for this reason, an increased amount of adhesive must be applied. If flexible substrates are bonded, it is known that, on the one hand, the adhesive layer must ensure adhesion over the whole surface but, on the other, must not be too thick so as to result in a sufficient flexibility of the bonded composite substrate. Otherwise, cracks can occur or the adhesive composite can delaminate. Furthermore, for many purposes, the adhesive layer must not be detectable between the film substrates.

It is also known to bond substrates and to heat at least one of the substrates. If heating is carried out in a planar manner, then this can lead to deformation. If heating is carried out after bonding, then the entire composite must be heated, which may damage the composite.

The object of the present invention is therefore to provide a method and a device with which the film can be bonded on different substrates, for example solid substrates or flexible substrates. In doing so, only a small amount of adhesive is to be applied. Furthermore, bonding over the whole surface is to be ensured. In addition, fast bonding is to be achieved by the method and the device so as to accelerate the further processing of the composite substrate obtained. Furthermore, the method is to make it unnecessary to thermally treat the entire composite and, finally, deformations of the substrates as a result of heating are to be avoided as far as possible.

This object is achieved by a method with the characteristics of claim 1 and by a device for carrying out such a method with the characteristics of claim 6.

Advantageous developments are specified by the corresponding dependent claims.

The basic concept of the invention is a method for preferably continuously bonding two substrates, wherein an adhesive is applied to a first substrate, a second film-type substrate consisting of a thermoplastic material is transported in a feed direction and converted into a plasticized state by heating with electromagnetic radiation in the form of a laser beam, wherein the laser beam is guided over the second substrate at an angle with regard to the feed direction, and wherein the side of the first substrate which is coated with adhesive is bonded to the side of the second substrate which is irradiated by the laser beam.

As the first substrate for the method according to the invention, a choice can be made from a multiplicity of different materials. These can be solid materials, for example wooden materials, metals, for example aluminum, iron or zinc, duroplastic or thermoplastic materials, such as polyvinyl chloride (PVC), polypropylene (PP), polystyrene (PS), Acrylonitrile Butadiene Styrene copolymers (ABS), polyesters or polyamides, organic polymers, such as cellophane, paper, cardboard or other materials. Flexible, film-type materials can be used for the first substrate. Multi-layer substrates can be chosen; the surface can be coated, for example by means of metal, oxide or plastic coatings, printed, colored or chemically modified. However, substrates consisting of materials which are suitable for the second substrate, can also be chosen.

Materials suitable for the second substrate are preferably flexible film materials, such as those consisting of thermoplastic materials in film form, for example polyolefins such as polyethylene (LDPE, LLDPE, metallocene catalyzed PE, HDPE) or polypropylene (OPP, CPP, OPP); polyvinyl chloride (PVC); ethylene copolymers such as ethylene vinyl acetate (EVA), ethylene acrylate copolymers (EMA), EMMA, EAA; polyesters; PLA, polyamide or ionomers such as ethylene/acrylic acid copolymerisates. At the same time, the film materials can also be modified, e.g. by modifying the plastic surface with functional groups, or additional components, for example pigments or colorants, can be contained in the films. These thermoplastic materials must have a plasticizing temperature below 200° C., in particular below 150° C. The second substrate can also be a composite substrate as long as the surface of the composite substrate to be bonded is thermoplastically coated. On the whole, the films can be colored, colorless or transparent. In particular, polyolefins and other ethylene copolymers are suitable polymers. Flexible films are understood to mean the usual thin, web-shaped substrates which are known, for example, as packaging films, decorative films, tape or in similar forms.

The plasticizing temperature (or also softening point) is preferably the peak melting temperature $T_{pm}$ which can be determined in accordance with norm DIN EN ISO 11357-3:2011 by means of DSC at a heating rate of 10 K/min.

Pre-treatment of the surface of the substrate can be carried out. In doing so, the plastic surfaces can be cleaned and, if necessary, they can be subjected to further physical, chemical or electrochemical pre-treatment before bonding.

According to the method according to the invention, an adhesive is applied to a first substrate. The adhesive can be applied using the known methods, for example spraying, spreading, roller application, printing or other known methods. Preferably, the adhesive is applied with a small layer thickness. This substrate can be a solid substrate; it can equally well be a film-type, flexible substrate. The adhesive to be applied can be matched to the requirements of the bond. If aqueous adhesives are used, it is expedient when the water is diverted from the surface. If adhesives containing solvents are chosen, the surface must be stable against the contained solvent. If hot melt adhesives are chosen, the surface must not be adversely affected by the possible introduction of heat. Reactive adhesives may possibly give an improved adhesion to the substrate. If radiation cross-linking adhesives are used, the adhesive layer can preferably be irradiated before the substrates are joined together in order to obtain cross-linking.

In adapting to the adhesive, if necessary, the execution of the method can include appropriate measures such as drying in drying zones, heating in heating zones or other supporting measures. After applying a suitable adhesive to the first substrate, the second substrate is brought together with the first substrate and bonded.

According to the invention, before bonding the substrates, it is necessary for the second substrate to be heated on the surface to be bonded. In doing so, the heating must preferably be carried out such that only the surface is heated; if possible, the mechanical properties of the second substrate must not be adversely affected. The heating of the surface to be bonded is carried out without contact. According to the invention, electromagnetic radiation in the form of a laser beam is used for heating the surface. This enables a large amount of energy to be introduced in a short time on a limited surface area. In contrast to heating with a lamp, the surface of the second substrate is therefore not heated over a large area for a long time. In the course of the method, the two substrates are brought together for bonding. For this purpose, the second substrate is transported by means of a feed device and is therefore subjected to tensile stresses. These tensile stresses can lead to deformation of the substrate if larger areas of the substrate are softened. The use of a laser beam enables targeted, focused heating shortly before the substrates are bonded. This reduces deformation. A further advantage of using a laser beam is that the heat dissipated to the environment is small. This protects the machine components and reduces the energy requirement. In addition, lasers work with a comparatively high efficiency and are therefore very energy-efficient. Finally, laminating machines can also be comparatively easily retrofitted with a laser unit.

Preferably, infrared radiation (IR radiation) in a wavelength range of 0.8 to 25 μm is chosen for the electromagnetic radiation. This includes near infrared (NIR) in a wavelength range of 0.8 to 2.5 μm, which corresponds to a wavenumber range of 12500 to 4000 $cm^{-1}$, and mid infrared (MIR) in a wavelength range of 2.5 to 25 μm, which in turn corresponds to a wavenumber range of 4000 to 400 $cm^{-1}$. As the frequencies or wavenumbers of the oscillations of atoms or atom groups likewise lie in these ranges, MIR and NIR radiation is absorbed particularly well under oscillatory excitation. This leads to an energy-efficient and rapid heating of the irradiated substrate. Preferably, here, the wavelength range is from 2.5 to 25 μm, in particular from 2.5 to 11 μm, as the oscillating frequencies of the atom groups frequently represented in polymers, such as for example O—H, N—H, C—H, C=O, C=C, lie in this range. Therefore, common thermoplastic materials preferentially absorb IR radiation in this wavelength range. There are numerous laser types which emit IR radiation in the range from 0.8 to 25 μm. These include, for example, gas lasers, such as carbon monoxide and carbon dioxide lasers ($CO_2$ lasers), and also solid lasers, such as for example Nd:YAG, NdCrYAG, EnYAG, Nd:YLF, Nd:YVO$_4$, Nd:glass, Tm:YAG, Yb:YAG, Ho:Yag and Cr:ZnSe lasers. Carbon dioxide lasers are particularly preferred. $CO_2$ lasers work with a wavelength of 9.4 μm and 10.6 μm. At the same time, the use of $CO_2$ lasers has several advantages: $CO_2$ lasers can be operated continuously. Their efficiency is very high, i.e. they work particularly energy-efficiently. The power of the beam can also be from a few milliwatts (mW) to hundreds of kilowatts (kW). Furthermore, $CO_2$ lasers are available comparatively inexpensively and are easy to implement.

Preferably, the laser has a power of less than 2000 W, preferably between 500 and 1500 W. If the power of the laser is too high, there is a risk of the substrate being cut. If, on the other hand, the power of the laser is too low, the surface of the substrate is not heated sufficiently.

In a particular embodiment, the laser is operated continuously (CW operation). In a further embodiment, it is operated in pulsed mode, wherein the pulse frequency is chosen to be sufficiently high that it almost corresponds to CW operation, that is to say quasi-continuous. Under certain circumstances, low pulse rate operation of the laser can lead to the surface not being homogeneously irradiated. Uniform softening is therefore not guaranteed under certain circumstances, which leads to defects in the composite body. On the other hand, continuous or quasi-continuous operation enables every point on the surface of the second substrate to be heated, thus resulting in homogeneous bonding. Further, according to the invention, it is provided that the laser beam is guided over the second substrate at an angle with regard to the feed direction, wherein the side of the first substrate which is coated with the adhesive is bonded to the side of the second substrate which is irradiated by the laser beam.

Within the meaning of the present invention, the feed direction is understood to mean the direction of movement of the second substrate at the point at which the laser beam impinges. In FIG. 1, the feed direction 12 is the same as the transport direction. Within the meaning of the invention, guiding the laser beam at an angle with regard to the feed direction is understood to mean that the laser beam is guided in such a way that the projection movement direction of the projection of the laser beam runs at least temporarily at an angle to the feed direction. The projection of the laser beam on the surface therefore runs temporarily in a direction other than the feed direction.

Angled guiding of the laser beam over the second substrate enables the substrate to be heated directly before the substrates are bonded. This has several advantages compared with planar irradiation, which results, for example, from using an infrared lamp. On the one hand, the time between heating and bonding can be shortened. The undesirable cooling of the substrate, which occurs after irradiation up to the time of bonding, is therefore reduced. Less energy therefore has to be used in order to compensate for this heat loss. The method is therefore more energy efficient and reduces an undesirable dissipation of heat to the environment. In addition, as a result of the angled guiding of the laser compared with planar irradiation by an IR lamp for example, the second substrate is not plasticized over the whole area. This increases the form stability of the substrate. A second substrate which is plasticized over a large area namely yields to a tensile stress, which can be exerted, for example, by a feed device, and expands. As the length of the first substrate remains substantially unchanged, this leads to an incongruence of the two substrates that is to say to a disparity with regard to the dimensions of the two substrates. It is therefore to be seen that, after cooling, the composite bodies warp of their own accord or even curl up. Such a deformation is substantially not to be observed in the case of an angled guiding of the laser beam and the heating along a line at an angle to the feed direction which is achieved as a result.

It is therefore expedient when the heating takes place quickly and only a small area of the surface to be bonded is heated shortly before bonding. In this way, it can be ensured that the mechanical properties of the second substrate are only slightly or, in the ideal case, not at all adversely affected. It is also possible to provide a support on the back of the second substrate in order to maintain the form. In a first embodiment, the two substrates are brought together and bonded immediately after heating. To ensure that the surface of the second substrate does not cool down too much after heating before the substrates are bonded, the heated area of the second substrate is preferably brought together with the first substrate after less than 1 s, particularly preferably after less than 0.1 s, in particular after less than 0.01 s.

The heating of the surface must take place at a temperature which is preferably approximately equal to the plasticizing temperature of the thermoplastic substrate. However, it is known to the person skilled in the art that thermoplastic materials can also be in a plasticized state in a certain temperature range around the plasticizing temperature. The surface of the second substrate must therefore be heated preferably to a temperature of +/−40° C. of the plasticizing temperature of the polymer at the surface, particularly preferably +/−20° C. At these temperatures, the surface of the substrate becomes soft and, if necessary, deformable or flowable under pressure.

In a preferred embodiment, either a non-thermoplastic substrate or a thermoplastic substrate with a sufficiently high plasticizing temperature is used for the first substrate so that the surface of the first substrate does not soften in the course of the method.

Notwithstanding one theory, it is assumed that the surface roughness of the substrate surface is reduced by heating and pressing with the adhesive-coated first surface. This enables a particularly low layer thickness of the applied adhesive between the substrates to be achieved. It can be assumed that the surface is smoothed. As a result, less adhesive is required for the bond.

Preferably, the adhesive is applied with a small layer thickness. In doing so, the amount of applied adhesive is preferably less than 2 $g/m^2$, particularly preferably less than 1 $g/m^2$, further preferably less than 0.9 $g/m^2$, in particular less than 0.5 $g/m^2$. At the same time, the amount of applied adhesive is preferably more than 0.05 $g/m^2$, in particular more than 0.2 $g/m^2$. The optimum amount applied here is chosen according to the surface roughness or unevenness of the substrate; unevenness can occur, for example, as a result of printing the substrate and depends on the print pattern as well as the amount of printing ink applied. A flat bond is achieved as a result of bonding under pressure in spite of the small amount of adhesive.

The usual devices for bringing together and bonding can be used. For example, dies, rolls, rollers and plates can be used to bring the substrates together, in particular by pressing or rolling the substrates against one another. The pressure on the substrates, constituted by bringing together by means of rollers, can be between 0.2 to 15 bar for example. In the particular embodiment for bonding two film substrates, such laminating devices are generally known to the person skilled in the art.

As a result of bringing together the side of the first substrate which is coated with adhesive and the surface of the second substrate which is irradiated by the laser beam and therefore heated, the thin layer of adhesive can also be heated. This can lead to a faster buildup of adhesion and to faster cross-linking.

Preferably, adhesives which can be applied in liquid form are used for the method according to the invention. These can be aqueous dispersions and solvent-containing non-reactive or reactive adhesives; alternatively solvent-free liquid or solid meltable adhesives can be used. They can be 1-component systems or 2-component systems.

Examples of suitable adhesives are those based on the thermoplastic polymers such as polyurethanes, EVA, polyacrylates; solvent-containing adhesives such as acrylate adhesives, 1-component or 2-component polyurethane adhesives, silane cross-linking adhesives; reactive melt adhesives such as 1-component PU adhesives; or solvent-free 1-component or 2-component PU adhesives, silane systems or radiation cross-linked adhesives.

According to the invention, it is expedient when the adhesive has a low viscosity. The viscosity of a suitable adhesive on application is, for example up to 10000 mPas, preferably up to 5000 mPas (measured with a Brookfield viscometer; ISO 2555:2000). The measuring temperature is matched to the application temperature. For adhesives which are liquid at room temperature, the viscosity is determined at 20 to 40° C., for example; for melt adhesives, the measuring temperature can be 100 to 150° C. For more viscous adhesives, measuring can also be carried out from 40 to 100° C. for example. Aqueous or solvent-containing adhesives often have a low viscosity up to 500 mPas; melt adhesives frequently have a viscosity greater than 1000 mPas.

According to the method according to the invention, bonds can be performed in a wide field of applications. If solid substrates are bonded to film-type substrates, the adhesive is applied to the solid substrate, which is pretreated if necessary. A film with a surface consisting of thermoplastic polymers is applied to the surface so coated as a second substrate. This is plasticized at the surface by heating the surface of the thermoplastic film by means of said electromagnetic radiation. Applying pressure during bonding can ensure that a particularly smooth surface of the thermoplastic substrate to be bonded is obtained. No bubbles or delamination are observed. Another method works with a flexible first substrate, onto which a thin layer of adhesive is applied. A second film substrate, which must have a layer consisting of thermoplastic polymers at the surface, is then likewise applied to this surface under pressure. Here too, heating and joining together with the first substrate ensures that a particularly smooth surface of the second substrate is obtained.

Joining of the side of the first substrate which is coated with adhesive and the side of the second substrate which is irradiated by the laser beam can be assisted, for example, by pressure. This can be from 0.2 to 16 bar, for example, exerted on pressure rollers. According to the invention, it is possible to achieve bonding of the substrates over the whole area with thin application weights of adhesives.

A method according to the invention in which the substrates are transported through the rollers at a speed of more than 10 m/min, in particular more than 100 m/min, has proved to be particularly advantageous.

In an advantageous development, the two substrates are laminated against one another by means of rollers, as described above, wherein the laser beam impinges on the second substrate preferably less than 10 cm, particularly preferably less than 1 cm, before the roll gap.

A thickness of the application line on the second substrate with a width in the range from 0.1 to 20 mm, preferably from 1 to 10 mm, is particularly advantageous.

The time between heating and bonding is greatly reduced as a result of the high speed, the short distance of the laser beam from the roll gap and the small thickness of the application line. As already discussed, a reduction in the time between irradiation and bonding leads to an improvement in the energy efficiency, and the resulting composite bodies exhibit substantially no undesirable deformations.

In an advantageous development of the invention, the laser beam is deflected by means of a polygonal mirror which can be rotated about an axis of rotation, if necessary focused before and/or subsequently by focusing means, and guided along a line over the second substrate. The use of a polygonal mirror enables a very rapid movement of the laser beam over the substrate surface.

The rotational speed of the polygonal wheel is to be chosen in particular depending on the web speed, the beam diameter, the line distance and the distance from the polygonal wheel to the substrate. In an embodiment, it has been shown to be particularly advantageous when the rotatably mounted polygonal mirror rotates around the said axis of rotation at a speed of more than 300, in particular more than 1000 revolutions per minute.

Further, it is of advantage to bond the two substrates continuously, wherein the laser beam is guided over the substrate in such a way and matched to the feed speed in such a way that the time between the impingement of the laser beam and the subsequent bonding is substantially the same for each point of the surface of the second substrate to be bonded. This ensures that the heating and consequently also the softening is substantially the same for every point of the surface of the second substrate to be bonded.

At the same time, it has been shown to be advantageous to guide the laser beam over the second substrate substantially linearly and/or substantially orthogonally to the feed direction. The movement of the point produced by the laser beam on the substrate surface along the projection movement direction results in a projection line with a projection width which is determined by the cross section of the laser beam. By suitable choice of projection speed, feed speed and projection width, it can be ensured that the second substrate has the same temperature at all points on a line orthogonal to the feed direction.

Particularly advantageous is a guiding of the laser beam in such a way that the vector of the direction of arrival of the laser beam and the vector of the production direction form an angle of less than 120°, preferably less than 90°, particularly preferably less than 60°. This enables the surface of the second substrate to be irradiated at as short a distance as possible before bonding to the first substrate.

A composite substrate or a composite body produced by the method according to the invention is also the subject matter of the invention. Here, the first substrate can be a rigid or solid substrate, for example a mold body consisting of different materials. Preferably, these have only a small surface roughness. As a further embodiment, the first substrate can consist of a flexible substrate; here, material and properties of this flexible substrate can be varied within wide limits. The material can also be the same material as that of the second substrate. Preferably, however, the two substrates are different. The first substrate can also be processed or printed if necessary. The surface of the first substrate is not affected by the application of a thin layer of adhesive. A possible water or organic solvent content and the small heat content of the applied adhesive are chosen such that the properties of the surface of the first substrate are substantially unaffected.

A substrate, which consists of thermoplastic polymers at least on the surface to be bonded, is chosen for the second substrate of the composite object according to the invention. It can be a single-layer film, but multi-layer films can also be chosen. The composite substrate according to the invention is obtained by joining and pressing the two different substrates.

The composite substrates according to the invention have a high strength of the bonded single substrates. The preferably low layer thickness of the adhesive layer ensures a high cohesion of the adhesive. Furthermore, the low layer thickness of the substrate results in an improved flexibility of the adhesive layer. As a result, composite substrates according to the invention have a high stability against elastic deformation.

Subject matter of the present invention is also the use of a described composite body produced in accordance with the method according to the invention for the packaging of foodstuffs.

A further basic concept of the present invention is the provision of a device in particular for carrying out a method according to the invention for preferably continuously bonding a first preferably film-type substrate to a second film-type substrate consisting of a thermoplastic material, having an applicator device for applying an adhesive to the first substrate; at least one feed device for transporting at least the second substrate in a feed direction; a heating device for heating the surface of the second substrate which is bonded to the first substrate, wherein the heating device is designed and is arranged in such a way that the second substrate can be converted into a plasticized state by heating, wherein the heating device has a laser which emits electromagnetic radiation in the form of a laser beam as a heat source, and wherein the laser beam is guided for heating the second substrate in such a way that its projection on the surface is moved in a relative movement with regard to the surface in a projection movement direction, wherein the projection movement direction is provided at least temporarily at an angle to the feed direction in order to enable preferably planar heating of the second substrate when the second substrate moves in the feed direction before the two substrates are bonded, and a pressing device for pressing the two substrates after heating the second substrate.

With regard to the suitable and preferably used substrates and adhesive, reference is made to the detailed comments above, which, in this regard, are intended to expressly supplement the disclosure relating to the device.

All suitable feed options known to the person skilled in the art which allow particularly the second substrate to move in a feed direction can be used for the feed device. Within the meaning of the present invention, the feed direction is understood to mean the direction of movement of the second substrate at the point at which the laser beam impinges. Preferably, the feed device is designed in such a way that it enables a continuous feed of the second substrate in the feed direction. A further feed device for the first substrate, which likewise preferably enables a continuous feed, can also be provided. In this case, the two feed devices are preferably coupled, or connected by means of a controller, in particular a control unit, in such a way that a uniform feed of the two substrates can be guaranteed. In an embodiment, the feed of the substrates can also be enabled by the yet to be explained pressing device, which, in this case, is preferably designed in the form of rolls or rollers and enables a continuous drawing-in and therefore feed of the substrates; preferably, in such a case, the substrates are fed by means of the rolls or rollers at a speed of more than 10 m/min, in particular more than 100 m/min.

According to the invention, the heating device has the laser, which emits electromagnetic radiation in the form of a laser beam, as the heat source. In addition, further elements can be part of the heating device, in particular focusing devices for the laser beam and other peripheral and supporting devices known to the person skilled in the art. Here, the laser is preferably operated continuously and not in pulsed mode.

With regard to the preferred characteristics and properties of the laser, such as in particular the wavelength range of the emitted radiation, type of laser and preferred power ranges, reference is made to the detailed comments above, which, in this regard, are intended to expressly supplement the disclosure relating to the device.

According to the invention, it is additionally provided that the laser beam for heating the second substrate is guided in such a way that its projection on the surface is moved in a relative movement with regard to the surface in a projection movement direction. The laser beam is accordingly moved or deflected in such a way that its projection is moved over the surface of the second substrate independently of the movement of the substrate in the feed direction. This active projection movement of the laser beam over said surface is therefore achieved by the active movement or deflection of the beam.

Further, according to the invention, it is provided that the laser beam is guided in such a way that the projection movement direction of the projection of the laser beam is provided at least temporarily at an angle to the feed direction. This is understood to mean a projection movement in which the projection of the laser beam on the surface is moved at least temporarily in a direction other than the feed direction. In this case, feeding of the second substrate in the feed direction therefore gives rise, on the one hand, to an active projection movement over the surface by deflecting or moving the laser beam over the surface at an angle to the feed direction and to a passive projection movement due to the feeding of the second substrate itself. Particularly with suitable design and control, these two movements can enable the second substrate to be heated immediately before the substrates are bonded. Even planar heating, in particular heating of the surface over the whole surface, of the second substrate can be enabled.

Preferably, in doing so, the laser beam is guided or deflected in such a way that the projection is moved linearly over the surface. Particularly preferred is also a movement of the projection substantially orthogonal to the feed direction. Alternatively, such a preferably linear movement of the projection over the surface, in which the angle between the movement vector of the projection and the feed direction is chosen in such a way that, in particular on reaching the pressing device, all areas of the surface covered by the laser beam on a line orthogonal to the feed direction have the same temperature, can prove to be expedient.

Further, according to the invention, a pressing device, which, as described above, can be fitted with the usual devices for bringing together and bonding, is provided. For example, dies, rolls, rollers and plates can be used to bring the substrates together, in particular by pressing or rolling the substrates against one another. The pressure on the substrates, constituted by bringing together by means of rollers, can be between 0.2 to 15 bar for example. In the particular embodiment for bonding two film substrates, such laminating devices are generally known to the person skilled in the art.

When using rolls or rollers, a design and set-up of a pressing device of this kind has proved to be expedient in that the substrates are transported at a speed of more than 10 m/min, in particular more than 100 m/min through the rollers or rolls.

In a preferred embodiment of the device, a beam guide unit, which deflects the laser beam and is suitable for guiding the laser beam over the surface of the second substrate, is provided. In accordance with this, beam guiding is used for the active projection movement described above. Here, the beam guide unit can, of course, also be connected directly to the laser unit and therefore be part of the heating device. The beam guide unit can also have one or more focusing devices in order to focus the laser beam. Alternatively, however, a separate focusing device, which is entirely separate from the heating device and/or beam guide unit, can also be provided. As mentioned in the introduction, the beam guide unit is used in particular for the active projection movement described above, in which the projection of the laser beam is moved at least temporarily at an angle to the feed direction over the surface of the second substrate. The beam guide unit can comprise different elements which are known in the prior art and which are suitable for the special purpose and which are able to provide a deflection and guiding facility for the laser beam. For a movement of the projection in a spatial dimension, that is to say, for example, for the linear movement described above, the use of a galvanometer drive, a preferably continuously rotating mirror or a preferably continuously rotating reflecting prism is therefore conceivable. The latter is also known as a polygonal mirror. Further, a two-dimensional movement of the projection is possible so that in particular two mirrors, which can be deflected in two directions, can be used here. Alternatively, the use of two orthogonally rotatable and adjacent mirrors, by means of which the laser beam is reflected, is conceivable.

In a preferred embodiment, a rotatably mounted polygonal mirror for deflecting the laser beam is used to guide the laser beam over the surface of the second substrate and therefore to move the projection of the laser beam over the surface for the purpose of heating. The preferred linear movement of the projection over the surface described above is possible particularly easily by this means. Here, the polygonal mirror is preferably designed in such a way that the laser beam is always guided in the same direction from one side in each case to an opposite side of the second substrate over its surface at an angle to the feed direction. In doing so, in the preferred exemplary embodiment, when the second substrate is fed forward, the movement of the projection always takes place in parallel lines from the first side towards the second side at an angle to the feed direction of the second substrate. At the same time, as described above, the movement is preferably provided orthogonally to the feed direction.

With an alternative preferred embodiment, particularly for a continuous bonding of the substrates, it must be achieved that all areas of the surface covered by the laser beam have the same temperature on a line orthogonal to the feed direction before reaching the pressing device. Here, a linear projection movement over the surface in the parallel manner described above is set up, in particular by means of the said rotatably mounted polygonal mirror, at an angle to the feed direction, in each case from a starting projection on the first side towards an end projection on the opposite second side, wherein the angle is chosen as a function of the width of the projection, the time between reaching two adjacent starting points by the laser beam and the speed of the continuous feed of the second substrate in such a way that the second substrate has the same temperature at all points on a line orthogonal to the feed direction after irradiating by the laser beam. In doing so, the guiding of the laser beam and its width are preferably chosen in such a way that no point on the surface is irradiated twice. In an advantageous development, after a linear and angled movement from a starting projection on the first side towards the end projection on the second side of the substrate, the form of the projection corresponds to a parallelogram, wherein the front side at the edge region of the second side of the substrate viewed in the projection direction aligns with the rear side at the edge region of the first side orthogonal to the feed direction.

A device according to the invention, with which a method according to the invention can be carried out, is described with the attached figures by way of example.

BRIEF DESCRIPTION OF THE DRAWINGS

FIG. 1 shows a schematic view of the device 1 according to the invention for continuously bonding a first substrate 2 in the form of a laminated film to a second film-type substrate 10 consisting of a thermoplastic material. Here, the first film-type substrate 2 is located on a storage roller 3 and is guided by means of a feed device, which is not shown in detail here and which, in particular can include a drive and a plurality of deflector and/or guide rollers, to an adhesive unit 4, in which an adhesive 6 is applied to one side of the first substrate in a planar manner by roller coating. The adhesive 6 is dispensed via an applicator nozzle 5 and accumulates in the intermediate space between an applicator roller 9 and a dosing roller 8. An adhesive film 7 is applied to the first substrate 2 by means of the applicator roller 9, wherein the amount of adhesive 6 to be applied can be adjusted by means of the dosing roller 8. In the exemplary embodiment shown, an adhesive film with a layer weight in the range from 0.05 $g/m^2$ to 0.9 $g/m^2$ is applied. Further, the adhesive unit 4 can include a storage container (not shown) for the adhesive in a cold state and a heating device (not shown) for heating and melting the adhesive.

Figure 1:
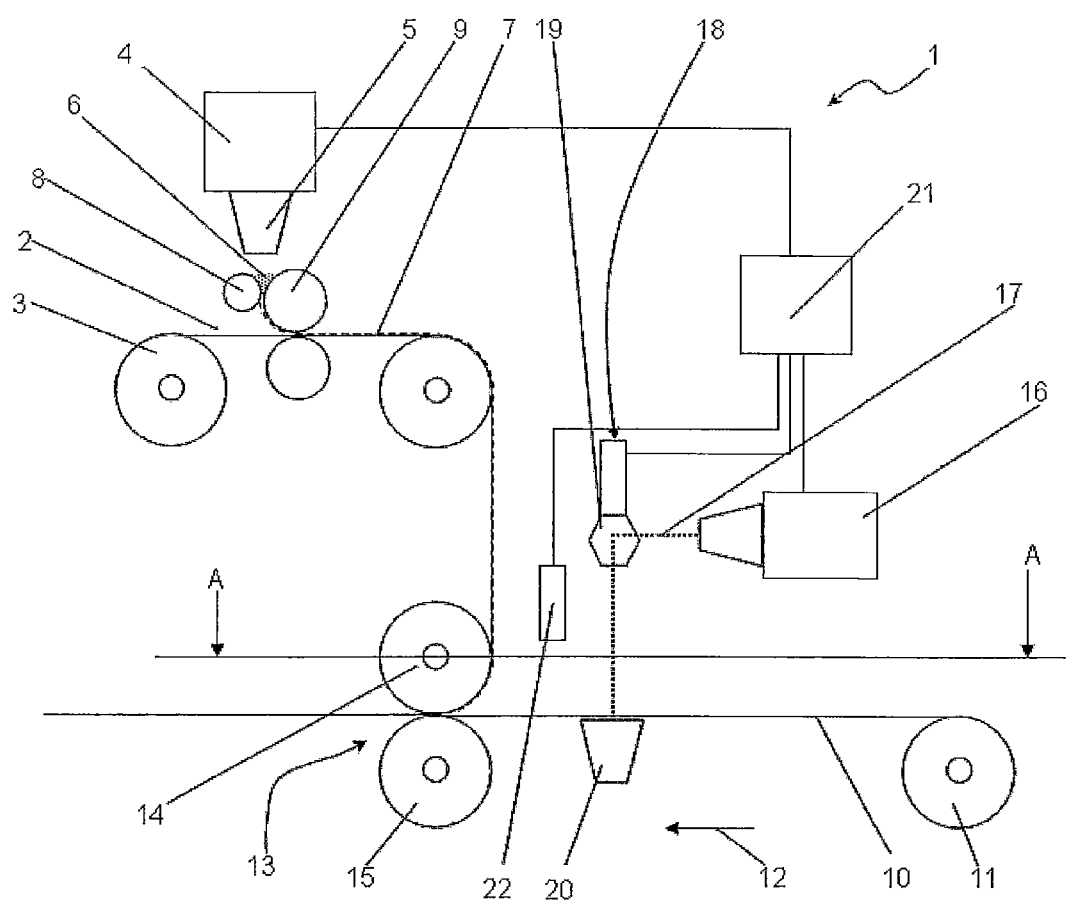
FIG. 1 shows a schematic view of a device according to the invention.

The same components are known to the person skilled in the art. It is, of course, also possible to provide the said and further components decentrally, that is to say not to provide them as part of the adhesive unit 4. The first substrate 2 coated with the adhesive film 7 is subsequently fed to a pressing unit 13 for pressing the side of the first substrate 2 coated with the adhesive film 7 onto the second substrate 10 in a planar manner.

Here, the second substrate 10 is in turn located on a storage roller 11 and is fed in a feed direction 12 to the pressing unit 13 by means of a feed device which is likewise not shown in detail. Immediately before reaching the pressing unit 13, the surface of the second substrate 10 which is to come into planar contact with the adhesive film 7 is heated by means of a heating device. In the exemplary embodiment shown, the energy for heating the second substrate 10 is introduced by means of a laser beam 17 in a wavelength range between 9 to 11 μm, which is emitted by a laser unit 16. In the exemplary embodiment shown, the laser unit 16 comprises a $CO_2$ laser, wherein the $CO_2$ laser has a power in the range between 500 and 1500 W. In addition, the $CO_2$ laser is operated continuously or quasi-continuously. A deflector unit 18, which in particular comprises a rotatably mounted polygonal mirror 19, is provided to guide the laser beam 17 over the surface of the second substrate 10. The polygonal mirror 19 has a drive in the form of a servomotor in order to drive the polygonal mirror 19 at a required rotational speed. The deflector unit can also comprise a focusing device (not shown). Particularly in conjunction with the rotatably mounted polygonal mirror 19, the deflector unit 18 provides a facility for deflecting the laser beam 17 and guiding it over the surface of the second substrate 10 so that its projection is moved in a relative movement with regard to the surface in a projection movement direction over the surface of the second substrate 10 to enable heating of the second substrate 10 and to convert the same into a plasticized state. At the same time, the deflector unit 18 is designed in such a way that it guides the laser beam 17 at least temporarily in such a way that the projection movement direction runs at an angle to the feed direction 12 over the surface of the second substrate 10 in order to enable heating of the surface in a planar manner when the second substrate 10 moves in the feed direction 12. In order to maintain the required temperature of the surface of the second substrate 10, a temperature sensor 22, which, after the guiding of the laser beam 17 over the surface and the accompanying heating of the same, measures the temperature of the surface immediately before reaching the pressing unit 13, is also provided. Further, a beam trap 20 is also provided in order to be able to block laser radiation possibly passing through the second substrate 10 in a controlled manner. To control the device 1, the feed devices, the adhesive unit 4, the laser unit 16, the deflector unit 18 and the temperature sensor 22 are connected to a control unit 21. Said control unit can in particular match feed speeds of the substrates 2, 10 and the guiding speed of the laser beam 17 over the surface of the second substrate 10 to one another so that the required temperature of the surface of the second substrate 10 is present.

In the further course of events, the surface of the second substrate 10, which has been converted by means of the laser beam 17 into the plasticized state, is brought into contact in the pressing unit with the side of the first substrate 2 which has been coated with the adhesive film 7. For this purpose, the two substrates 2, 10 pass through the pressing unit 13, wherein the two substrates 2, 10 are pressed together by means of a pressure roller 14 and a corresponding bearing roller 15.

Figure 2:
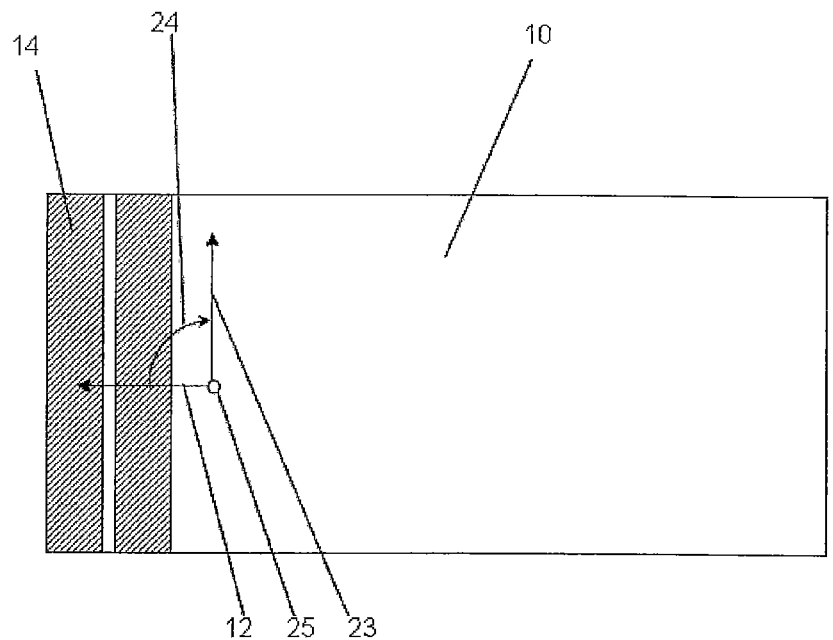
FIG. 2 shows a snapshot of a sectional view through the section line A-A of the device from FIG. 1.

FIG. 2 shows a side view through the section line A-A of the device from FIG. 1, wherein the section extends through the pressure roller 14 and the section surface runs parallel to the surface of the second substrate 10. Here, the device 1 is shown in a photographic snapshot to illustrate the irradiation of the second substrate 10 by the laser unit 16 described above and the deflector unit 18. The laser beam 17 impinges on the surface of the second substrate 10 in a projection 25, wherein the energy introduced results in a heating of the surface. For further heating of the surface, the laser beam 17 is deflected by means of the deflector unit 18 in such a way that its projection 25 moves over the surface in a projection movement direction 23. At the same time, this active projection movement relative to the surface is independent of the movement of the substrate in the feed direction 12. In the exemplary embodiment shown, the projection movement direction 23 runs substantially orthogonally to the feed direction 12.

Figure 3:
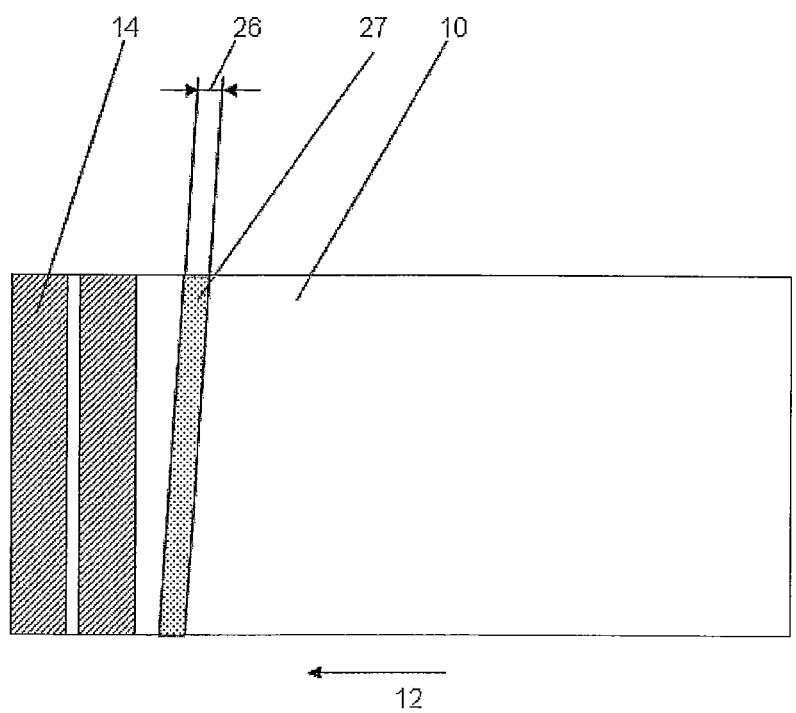
FIG. 3 shows the sectional view from FIG. 2 after the expiry of a time t.

FIG. 3 shows the section view from FIG. 2 after the expiry of a time t1 at which, on the one hand, the laser beam 17 has been guided over the second substrate 10 in such a way that the projection 25 shown in FIG. 2 has been moved from the first side of the substrate 10 to the opposite second side relative to the surface by means of the active projection movement described above. On the other hand, the second substrate 10 has been moved in the feed direction 12 during the irradiation such that a projection line in the form of a parallelogram extends over the surface even though the projection movement direction 23 has run substantially orthogonally to the feed direction 12. The movement of the second substrate 10 in the feed direction 12 has therefore led to a passive projection movement over the surface. The width of the projection line 27 has been set by the focusing device described above to a projection width 26 of approximately 8 mm.

Figure 4:
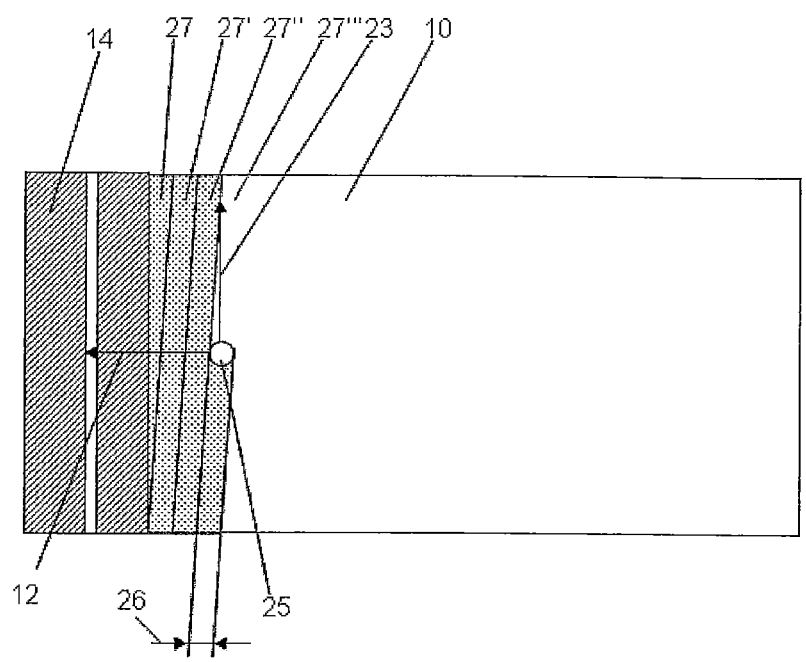
FIG. 4 shows the sectional view from FIG. 2 after the expiry of a time t2.

FIG. 4 shows the section view from FIG. 2 after the expiry of a time t2 which corresponds to a multiple of the time t1 from FIG. 3, at which, as described above, the laser beam 17 has been guided over the second substrate 10 in such a way that the projection 25 shown in FIG. 2 has been moved from the first side of the substrate 10 to the opposite second side relative to the surface by means of the active projection movement described above. As a result of using the rotatably mounted polygonal mirror 19, after reaching the second side of the substrate 10, the laser beam 17 is again deflected to the starting point on the first side of the substrate 10 from where it is once again guided over the surface. Here too, the projection movement direction 23 runs substantially orthogonally to the feed direction 12. At the same time, the projection width 26, the time between reaching two adjacent starting points on the first side of the substrate 10, and the movement speed of the second substrate in the feed direction 12 are chosen such that no point on the surface is irradiated twice, wherein the projection lines 27, 27', 27'', 27''' resulting from the projection 23 which is moved over the surface in the time t2 constitute parallelograms on the surface of the substrate 10 which abut one another. Further, said parameters are chosen such that the second substrate has the same temperature at all points on a line orthogonal to the feed direction after irradiation by the laser beam 17.

| List of references: | |
| --- | --- |
| 1 | Device |
| 2 | First substrate |
| 3 | Storage coil |
| 4 | Adhesive unit |
| 5 | Applicator nozzle |
| 6 | Adhesive |
| 7 | Adhesive film |
| 8 | Dosing roller |
| 9 | Applicator roller |
| 10 | Second substrate |
| 11 | Storage coil |
| 12 | Feed direction |
| 13 | Pressing unit |
| 14 | Pressure roller |
| 15 | Bearing roller |
| 16 | Laser unit |
| 17 | Laser beam |
| 18 | Deflector unit |
| 19 | Polygonal mirror |
| 20 | Beam trap |
| 21 | Control unit |
| 22 | Temperature sensor |
| 23 | Projection movement direction |
| 24 | Angle |
| 25 | Projection |
| 26 | Projection width |
| 27 | Projection line |

What is claimed is:

1. A method for bonding two substrates, wherein an adhesive is applied to a first substrate, a second film substrate consisting of a thermoplastic material is transported in a feed direction and a surface of the second film substrate is converted into a plasticized state by heating with electromagnetic radiation in the form of a laser beam, wherein the laser beam is guided over the second substrate at an angle of 120 degrees to 60 degrees with regard to the feed direction, and wherein the side of the first substrate which is coated with adhesive is disposed onto the side of the second substrate which has been irradiated by the laser beam.

2. The method according to claim 1, wherein the laser beam is parallel to and spaced from the feed direction and is deflected by means of a polygonal mirror which is rotatably mounted about an axis of rotation, and the laser beam is guided along a line over the second substrate.

3. The method according to claim 1, wherein the two substrates are bonded continuously, wherein the laser beam is guided over the second substrate and matched to a feed speed in so that the time between impingement of the laser beam and the subsequent bonding is substantially the same for each point of the surface of the second substrate to be bonded.

4. The method according to claim 1, wherein the laser beam is guided over the second substrate substantially orthogonally to the feed direction.

5. The method according to claim 1, wherein the laser beam is a laser beam with IR radiation in the wavelength range from 0.8 to 25 μm.

6. The method according to claim 1, wherein the adhesive is not a hot melt adhesive.

7. The method according to claim 1, wherein the second substrate is irradiated prior being bonded to the first substrate.

8. The method according to claim 1, wherein the entire surface of the second film substrate is converted into a plasticized state.

9. A method for bonding substrates, comprising:
- providing a first material having a first planar surface;
- applying adhesive to the first material first surface to provide a first material adhesive coated first surface;
- moving the first material in a feed direction;
- providing a second material having a first planar surface, the second material being a flexible thermoplastic film material having a plasticizing temperature;
- moving the second material in the feed direction;
- providing a laser beam parallel to and spaced from the feed direction;
- deflecting the laser beam toward the moving material first surface;
- irradiating only the moving second material first surface with the laser beam at an angle of 120 degrees to 60 degrees with regard to the feed direction to heat at least a portion of the second material first surface to about the plasticizing temperature to form a second material plasticized first surface; and
- contacting the adhesive coated first surface and the plasticized first surface to bond the first material to the second material.

10. The method of claim 9, wherein the step of applying adhesive to the first material first surface to provide an adhesive coated first surface occurs while moving the first material in the feed direction.

11. The method of claim 9, wherein the steps of irradiating the second material first surface with a laser beam and contacting the adhesive coated first surface and the plasticized first surface both occur while both the first material and the second material are each moving in the feed direction.

12. The method of claim 9, wherein the step of irradiating the second material first surface with a laser beam heats at least a portion of the second material first surface to a temperature in the range of 40° C. below the plasticizing temperature to 40° C. above the plasticizing temperature.

13. The method of claim 9, wherein the step of contacting the adhesive coated first surface and the plasticized first surface to bond the first material to the second material further comprises pressing the adhesive coated first surface and the plasticized first surface into contact with each other.

14. The method according to claim 9, wherein only the surface of the second film substrate is converted into a plasticized state.

* * * * *